(12) United States Patent
Lu et al.

(10) Patent No.: US 12,105,220 B2
(45) Date of Patent: Oct. 1, 2024

(54) DYNAMIC OUTGOING BEAM DIVERGENCE TUNING IN LiDAR

(71) Applicant: BEIJING VOYAGER TECHNOLOGY CO., LTD., Beijing (CN)

(72) Inventors: Yue Lu, Mountain View, CA (US); Youmin Wang, Berkeley, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 947 days.

(21) Appl. No.: 17/136,938

(22) Filed: Dec. 29, 2020

(65) Prior Publication Data

US 2022/0206120 A1 Jun. 30, 2022

Related U.S. Application Data

(63) Continuation of application No. 17/135,959, filed on Dec. 28, 2020.

(51) Int. Cl.
| | |
|---|---|
| *G01S 7/481* | (2006.01) |
| *G01S 7/497* | (2006.01) |
| *G01S 17/08* | (2006.01) |
| *G01S 17/89* | (2020.01) |
| *G01S 17/931* | (2020.01) |
| *G02B 26/08* | (2006.01) |
| *G02B 27/09* | (2006.01) |
| *G02B 27/30* | (2006.01) |

(52) U.S. Cl.
CPC .......... *G01S 7/4816* (2013.01); *G01S 7/4814* (2013.01); *G01S 7/4817* (2013.01); *G01S 7/497* (2013.01); *G01S 17/08* (2013.01); *G01S 17/89* (2013.01); *G01S 17/931* (2020.01); *G02B 26/0875* (2013.01); *G02B 27/0955* (2013.01); *G02B 27/30* (2013.01)

(58) Field of Classification Search
None
See application file for complete search history.

(56) References Cited

U.S. PATENT DOCUMENTS

| | | | |
|---|---|---|---|
| 10,969,474 B2* | 4/2021 | O'Keeffe | G01S 17/42 |
| 2004/0012770 A1* | 1/2004 | Stierle | G01S 17/08 |
| | | | 356/4.01 |

(Continued)

FOREIGN PATENT DOCUMENTS

WO WO-2015110916 A1 * 7/2015 ........... G02B 13/004

*Primary Examiner* — Eric L Bolda
(74) *Attorney, Agent, or Firm* — BAYES PLLC

(57) ABSTRACT

Embodiments of the disclosure provide a transmitter containing a divergence adjustment device, and an optical sensing method using the same. For example, the optical sensing method includes emitting, by an optical source of an optical sensing system, optical signals. The optical sensing method further includes dynamically collimating, by a tunable collimation lens of the optical sensing system, the emitted optical signals to varying divergences. The method additionally includes steering, by a steering device of the optical sensing system, the tuned optical signals toward an environment surrounding the optical sensing system. The method additionally includes receiving, by a receiver of the optical sensing system, the optical signals returning from the environment.

20 Claims, 8 Drawing Sheets

(56) References Cited

U.S. PATENT DOCUMENTS

2015/0378023 A1* 12/2015 Royo Royo ............ G01S 17/89
　　　　　　　　　　　　　　　　　　356/5.01
2016/0245919 A1* 8/2016 Kalscheur ............. G01S 7/4817
2018/0136318 A1* 5/2018 Uyeno .................. G01S 7/4815
2020/0333460 A1* 10/2020 Tsuji .................... G01S 17/89

* cited by examiner

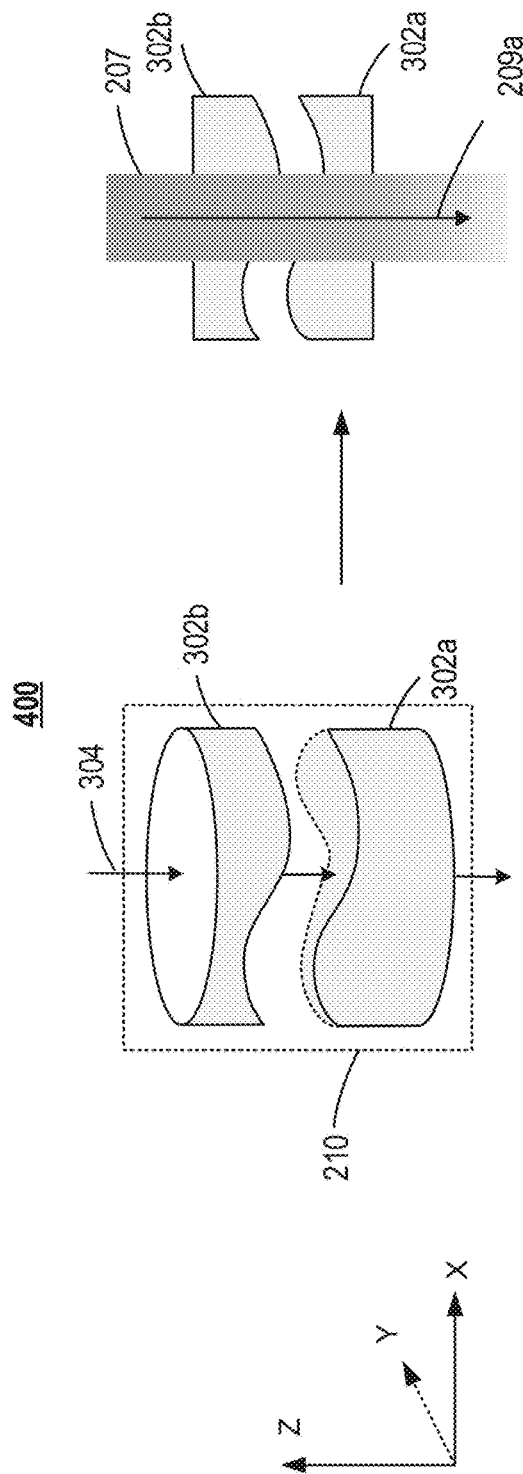
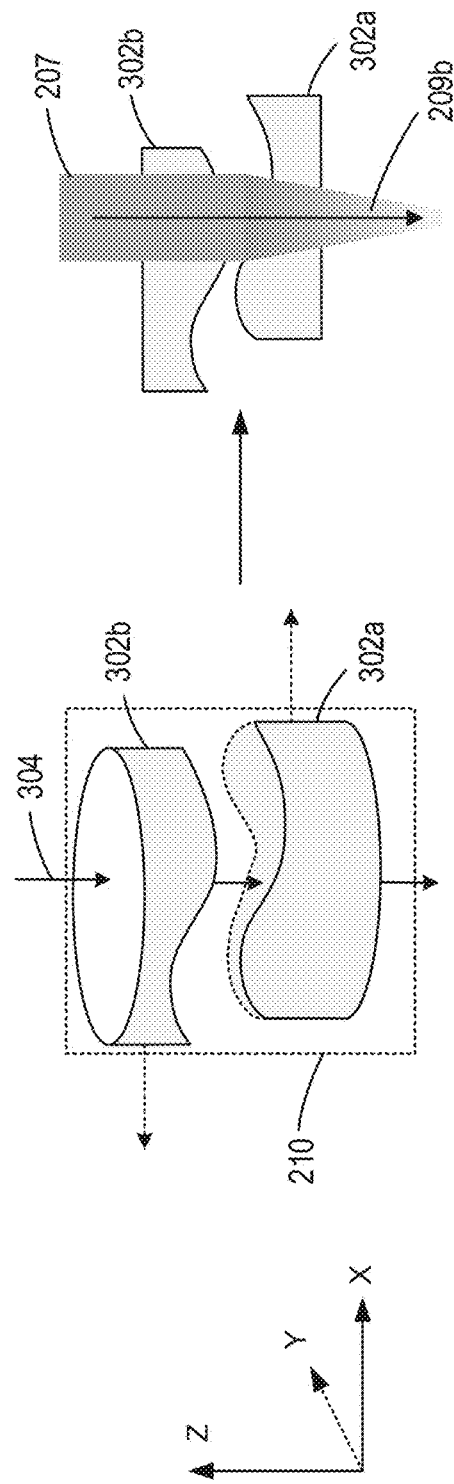
FIG. 3A
FIG. 3B

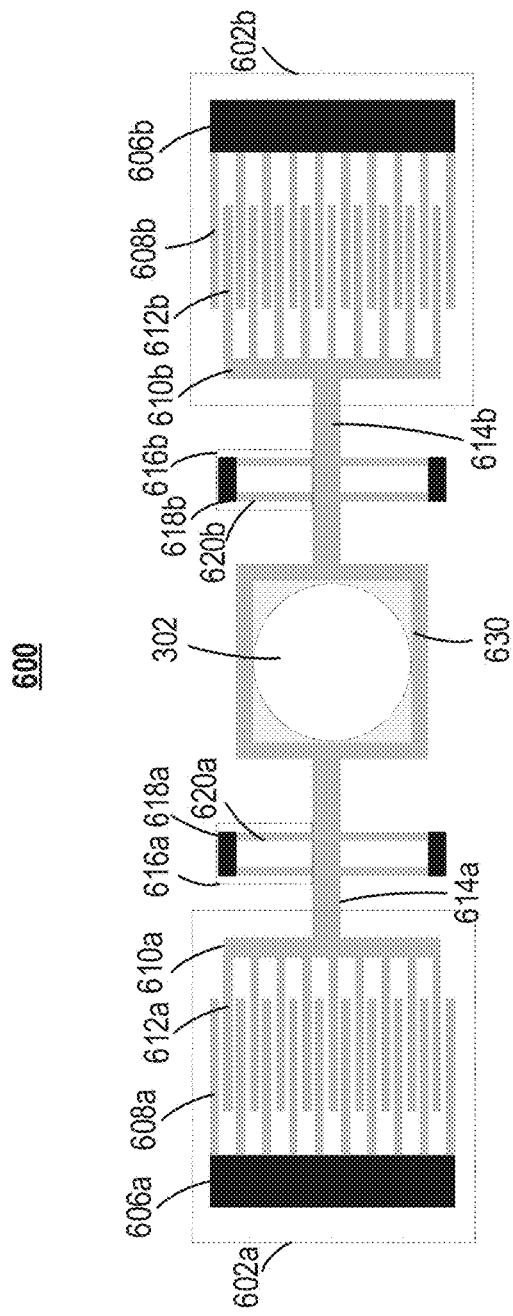
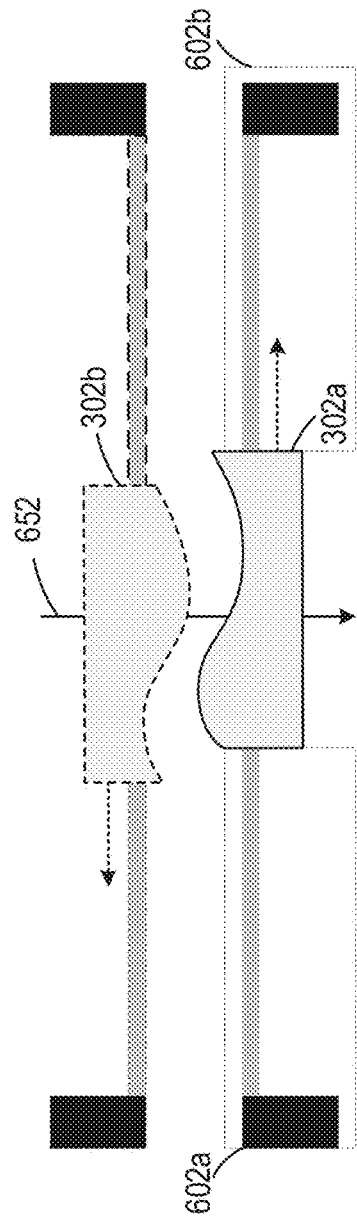
FIG. 6A
FIG. 6B

DYNAMIC OUTGOING BEAM DIVERGENCE TUNING IN LiDAR

CROSS-REFERENCE TO RELATED APPLICATION

This application is a continuation of U.S. application Ser. No. 17/135,959, filed on Dec. 28, 2020, entitled "MEMS ACTUATED ALVAREZ LENS FOR TUNABLE BEAM SPOT SIZE IN LIDAR," the content of which is incorporated herein by reference.

TECHNICAL FIELD

The present disclosure relates to a light detection and ranging (LiDAR) system, and more particularly, to a MEMS actuated Alvarez lens for tunable beam spot size in the LiDAR system.

BACKGROUND

In current LiDAR systems, beam divergence is a key factor that determines the finest optical resolution achievable by a LiDAR system. The beam divergence in a LiDAR system generally is dependent on the collimation of the transmitter module, which is a fixed value in most existing LiDAR systems. However, during optical sensing, the divergence requirements for objects at a close distance and objects at a far distance are usually different. For example, in a scanning flash LiDAR system, a small divergence laser beam (or equivalently a laser beam emitted at a close to 0 deg elevation angle) is generally required for the objects at a far distance, because such a small divergence may allow the returned beam size to be narrowed and incident on only a small number of photodetector pixels. This then helps to concentrate the returning laser power on a limited number of pixels, thereby boosting a signal to noise ratio (SNR) and increasing optical resolution for long-distance ranging. On the other hand, close distance ranging in a flash LiDAR generally does not require a large SNR because objects are closer. Accordingly, the optical beam sizes for these objects can be enhanced, and a relatively large number of pixels can be ranged at one time, therefore reducing the steps required for a scanning process. In addition, for close distance objects that the SNR requirement isn't so critical, diverging the beam to some extent may also help reduce detector saturation, and ease eye safety, among other advantages. Accordingly, there is a need for tuning beam divergence for detecting or sensing objects at a different distance from a LiDAR system.

Embodiments of the disclosure address the above problems by including a tunable collimation lens in the receiver of a LiDAR system.

SUMMARY

Embodiments of the disclosure provide an exemplary optical sensing system. The optical sensing system includes an optical source configured to emit optical signals. The optical sensing system further includes a tunable collimation lens configured to dynamically collimate the optical signals emitted by the optical source to varying divergences. The optical sensing system additionally includes a steering device configured to steer the tuned optical signals output from the tunable collimation lens toward an environment surrounding the optical sensing system. The optical sensing system additionally includes a receiver configured to receive the optical signals returning from the environment.

Embodiments of the disclosure further provide an exemplary optical sensing method. The method includes determining environment information of an environment surrounding the optical sensing system, where the environment information indicates a current detection distance of the optical sensing system. The method further includes determining a divergence amount for outgoing optical signals emitted by an optical source of the optical sensing system, based on the environment information. The method additionally includes dynamically adjusting the outgoing optical signals to the determined divergence amount. The method additionally includes emitting the outgoing optical signals to the environment.

Embodiments of the disclosure additionally provide an exemplary transmitter for an optical sensing system. The exemplary transmitter includes an optical source configured to emit a series of optical signals. The exemplary transmitter further includes a tunable collimation lens configured to dynamically collimate the optical signals emitted by the optical source to varying divergences. The exemplary transmitter additionally includes a steering device configured to steer the tuned optical signals output from the tunable collimation lens toward an environment surrounding the transmitter.

Embodiments of the disclosure additionally provide an exemplary optical sensing method. The method includes emitting, by an optical source of an optical sensing system, optical signals. The method further includes dynamically collimating, by a tunable collimation lens of the optical sensing system, the emitted optical signals to varying divergences. The method additionally includes steering, by a steering device of the optical sensing system, the tuned optical signals toward an environment surrounding the optical sensing system. The method additionally includes receiving, by a receiver of the optical sensing system, the optical signals returning from the environment.

Embodiments of the disclosure additionally provide an exemplary transmitter for an optical sensing system. The exemplary transmitter includes an optical source configured to emit optical signals. The exemplary transmitter further includes a controller configured to determine environment information of an environment surrounding the optical sensing system, and determine a divergence amount for the optical signals based on the environment information, where the environment information indicates a current detection distance of the optical sensing system. The exemplary transmitter additionally includes a divergence adjustment device coupled to the controller and configured to dynamically adjust the optical signals to the determined divergence amount for emitting to the environment.

It is to be understood that both the foregoing general description and the following detailed description are exemplary and explanatory only and are not restrictive of the present disclosure, as claimed.

BRIEF DESCRIPTION OF THE DRAWINGS

FIGS. 3A-3B each illustrate a side view of an exemplary tunable collimation lens with or without displacement respectively, according to embodiments of the disclosure.

FIG. 6A illustrates a top view of an exemplary Alvarez lens integrated into a platform including two comb drives, according to embodiments of the disclosure.

FIG. 6B illustrates a side view of two exemplary Alvarez lenses integrated into respective platforms, according to embodiments of the disclosure.

DETAILED DESCRIPTION

Figure 1:
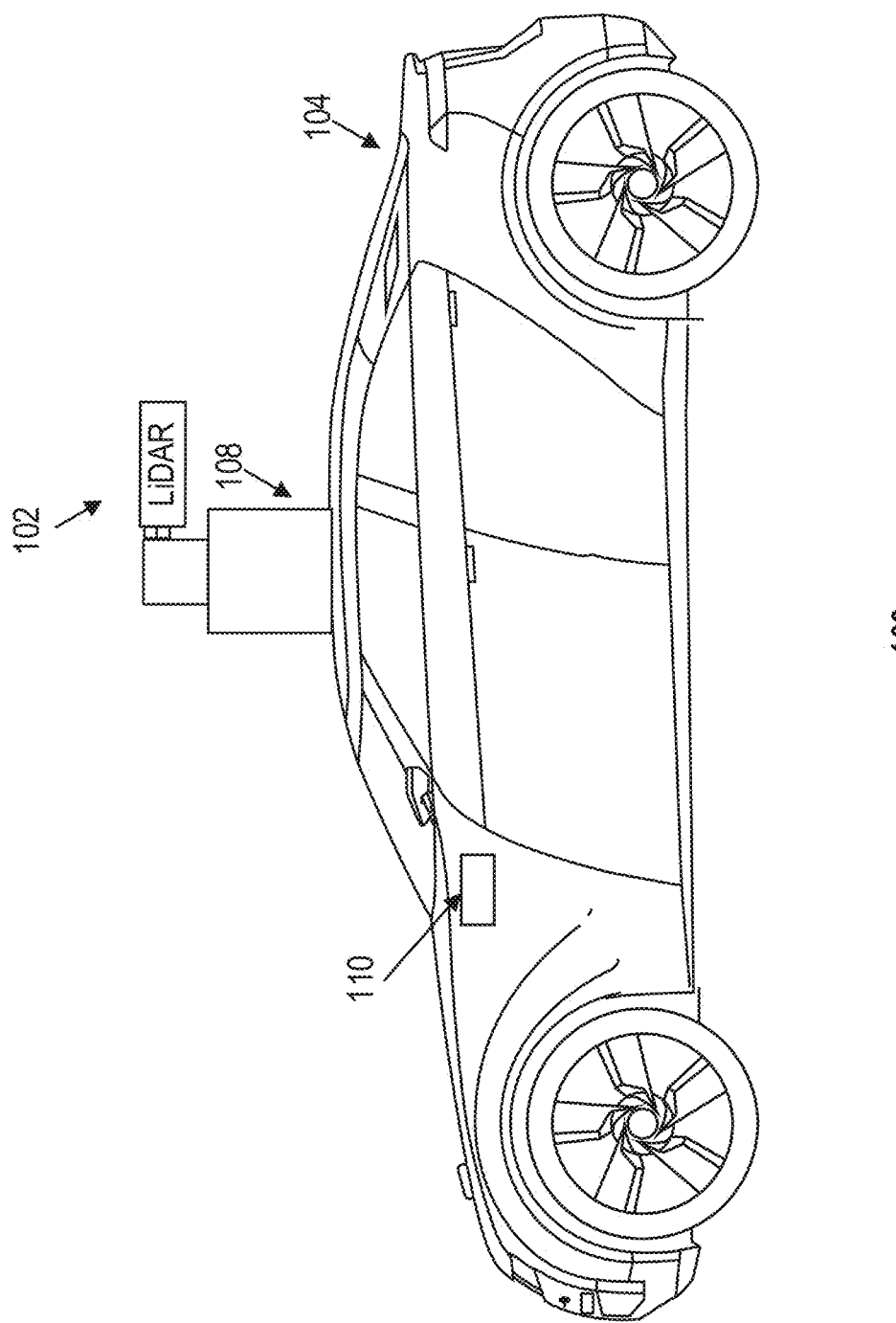
FIG. 1 illustrates a schematic diagram of an exemplary vehicle equipped with a LiDAR system containing a tunable collimation lens, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide a tunable collimation lens in a transmitter of a LiDAR system. According to one example, the tunable collimation lens may be disposed between an optical source and a steering device (e.g., a scanner) of the transmitter. The tunable collimation lens may include a pair of Alvarez lenses arranged along the optical axis of the transmitter. Each Alvarez lens may include a flat surface and a freeform surface opposite to the flat surface. The freeform surface may be a curved surface with a predefined shape. The two freeform surfaces of the two Alvarez lenses face each other and are complementary with each other when the two Alvarez lenses are aligned along the optical axis of the transmitter. The two flat surfaces of the two Alvarez lenses are in parallel with each other and are perpendicular to the optical axis. The two Alvarez lenses may be in a cylinder shape and the centers of the two Alvarez lenses may share a same axis when the two Alvarez lenses are not displaced (i.e., not driven by MEMS comb drive actuators to move away from the shared axis).

At least one of the two Alvarez lenses may be driven to move away from its default positions, i.e., displaced from their default positions. The displacement of the one or both moving Alvarez lenses may cause a misalignment between the two originally complementary freeform surfaces. Laser beams passing through the displaced Alvarez lenses may thus be collimated to laser beams with varying beam divergences. The amount of divergence is dependent on the displacement length (i.e., a travel distance from its default position) of one or both moving Alvarez lens. Accordingly, by controlling the movements of the two Alvarez lenses, the beam divergence of the collimated laser beams may be tuned to a target value for optimal detections of objects at a different distance from a LiDAR system.

By tuning the beam divergence of the laser beams emitted from a laser source, the beam spot size of the returning laser beams may be also adjusted accordingly, thereby allowing the signal picked up by each photodetector pixel to be adjusted through the beam divergence tuning process. The adjustable signal picked up by each photodetector pixel may then allow the sensing of the objects in the environment to be optimized. For instance, for objects at a close distance, the returned laser beams may be detected by a larger number of photodetector pixels such that the signal picked up by each photodetector pixel may be controlled to be not too strong, while for objects at a far distance, the returned laser beams may be detected by a smaller number of photodetector pixels such that the signal picked up by each photodetector pixel may be controlled to become stronger. In this way, the signal picked up by each photodetector pixel may be dynamically adjusted for optimal detection of objects at different distances from a LiDAR system. This then improves the accuracy and consistency of the LiDAR system in detecting objects at different distances.

The features and advantages described herein are not all-inclusive and many additional features and advantages will be apparent to one of ordinary skill in the art in view of the figures and the following descriptions.

The disclosed LiDAR system containing a tunable collimation lens can be used in many applications. For example, the disclosed LiDAR system can be used in advanced navigation technologies, such as to aid autonomous driving or to generate high-definition maps, in which the optical sensing system can be equipped on a vehicle.

FIG. 1 illustrates a schematic diagram of an exemplary vehicle equipped with an optical sensing system containing a tunable collimation lens, according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with an optical sensing system, e.g., a LiDAR system 102 (also referred to as "LiDAR system 102" hereinafter) mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 measures distance to a target by illuminating the target with laser beams and measuring the reflected/scattered pulses with a receiver. The laser beams used for LiDAR system 102 may be ultraviolet, visible, or near-infrared, and may be pulsed or continuous wave laser beams. In some embodiments of the present disclosure, LiDAR system 102 may capture point clouds including depth information of the objects in the surrounding environment, which may be used for constructing a high-definition map or 3-D buildings and city modeling. As vehicle 100 moves along the trajectory, LiDAR system 102 may continuously capture data including the depth information of the surrounding objects (such as moving vehicles, buildings, road signs, pedestrians, etc.) for map, building, or city modeling construction.

Figure 2:
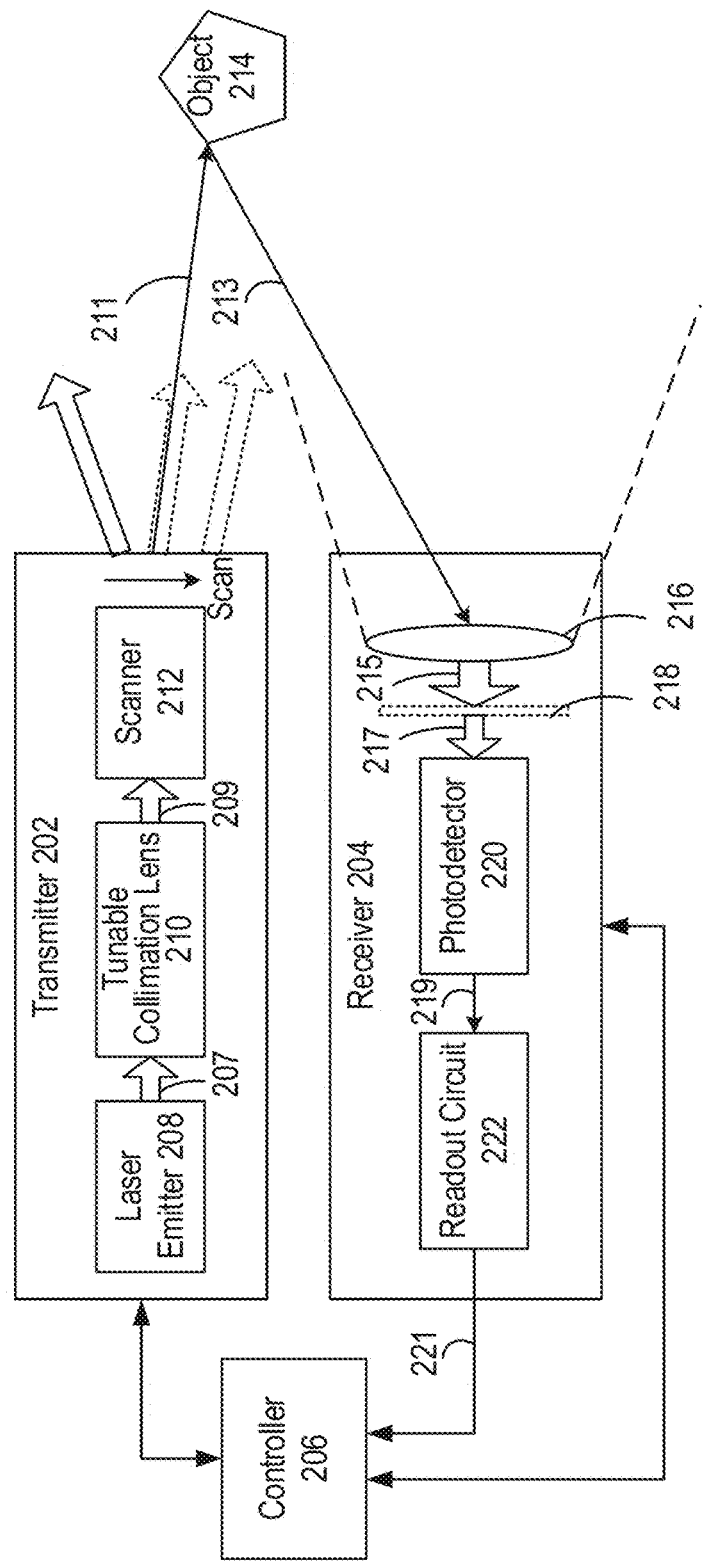
FIG. 2 illustrates a block diagram of an exemplary LiDAR system containing a tunable collimation lens, according to embodiments of the disclosure.

FIG. 2 illustrates a block diagram of an exemplary LiDAR system containing a tunable collimation lens, according to embodiments of the disclosure. In some embodiments, LiDAR system 102 may be a scanning flash LiDAR, a semi-coaxial LiDAR, a coaxial LiDAR, etc. As illustrated, LiDAR system 102 may include a transmitter 202, a receiver 204, and a controller 206 coupled to transmitter 202 and receiver 204. Transmitter 202 may further include a laser emitter 208 for emitting an optical signal and tunable collimation lens 210 for tuning a beam divergence of the emitted optical signal. In some embodiments, the transmitter 202 may additionally include a scanner 212 for steering the collimated optical signal according to a certain pattern. Receiver 204 may further include a receiving lens 216, a photodetector 220, and a readout circuit 222. In some embodiments, receiver 204 may further include an electric shutter 218 that is configured to limit the returning optical signals to be detected by photodetector 220 within certain time windows.

Transmitter 202 may emit optical beams (e.g., pulsed laser beams, continuous wave (CW) beams, frequency modulated continuous wave (FMCW) beams) along multiple directions. Transmitter 202 may include a laser emitter 208, a tunable collimation lens 210, and a scanner 212. According to one example, transmitter 202 may sequentially emit a stream of laser beams in different directions within a scan field-of-view (FOV) (e.g., a range in angular degrees), as illustrated in FIG. 2. The emitted laser beams may have varying beam divergences.

Laser emitter 208 may be configured to emit laser beams 207 (also referred to as "native laser beams") to tunable collimation lens 210. For instance, laser emitter 208 may generate laser beams in the ultraviolet, visible, or near-infrared wavelength range, and provide the generated laser beams to tunable collimation lens 210. In some embodiments of the present disclosure, depending on underlying laser technology used for generating laser beams, laser emitter 208 may include one or more of a double hetero-structure (DH) laser emitter, a quantum well laser emitter, a quantum cascade laser emitter, an interband cascade (ICL) laser emitter, a separate confinement heterostructure (SCH) laser emitter, a distributed Bragg reflector (DBR) laser emitter, a distributed feedback (DFB) laser emitter, a vertical-cavity surface-emitting laser (VCSEL) emitter, a vertical-external-cavity surface-emitting laser (VECSEL) emitter, an extern-cavity diode laser emitter, etc., or any combination thereof. Depending on the number of laser emitting units in a package, laser emitter 208 may include a single emitter containing a single light-emitting unit, a multi-emitter unit containing multiple single emitters packaged in a single chip, an emitter array or laser diode bar containing multiple (e.g., 10, 20, 30, 40, 50, etc.) single emitters in a single substrate, an emitter stack containing multiple laser diode bars or emitter arrays vertically and/or horizontally built up in a single package, etc., or any combination thereof. Depending on the operating time, laser emitter 208 may include one or more of a pulsed laser diode (PLD), a CW laser diode, a Quasi-CW laser diode, etc., or any combination thereof. Depending on the semiconductor materials of diodes in laser emitter 208, the wavelength of incident laser beams 207 may be at different values, such as 760 nm, 785 nm, 808 nm, 848 nm, 870 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as laser emitter 208 for emitting laser beams 207 at a proper wavelength.

Tunable collimation lens 210 may include optical components (e.g., lenses, mirrors) that can shape the laser beam and collimate the laser beam into a narrower laser beam to increase the scan resolution and the range to scan object 214. In some embodiments, the tunable collimation lens may include two Alvarez lenses that are configured to tune beam divergence amount of collimated laser beam. In some embodiments, tunable collimation lens 210 may include lenses with other shapes and structures that are configured to tune beam divergence of the collimated laser light.

In some embodiments, transmitter 202 may also include a scanner 212 configured to refract laser beams 209 as laser beams 211 to an object 214 in a range of detection angles (collectively forming the FOV of transmitter 202). In some embodiments, object 214 may be made of a wide range of materials including, for example, non-metallic objects, rocks, rain, chemical compounds, aerosols, clouds, and even single molecules. In some embodiments, at each time point during the scan, a scanner may emit laser beams 211 to object 214 in a direction within a range of scanning angles by rotating a deflector, such as a micromachined mirror assembly.

Receiver 204 may be configured to detect returned laser beams 213 returned from object 214. Upon contact, laser light can be reflected/scattered by object 214 via backscattering, such as Rayleigh scattering, Mie scattering, Raman scattering, and fluorescence. Returned laser beams 213 may be in a same or different direction from laser beams 211. In some embodiments, receiver 204 may collect laser beams returned from object 214 and output signals reflecting the intensity of the returned laser beams.

As illustrated in FIG. 2, receiver 204 may include a receiving lens 216, a photodetector 220, and a readout circuit 222. In some embodiments, receiver 204 may also include an electric shutter 218. Receiving lens 216 may be configured to focus and converge the returning optical signal directly on photodetector 220 as a focused laser beam 217, or on electric shutter 218 as a focused laser beam 215, where electric shutter 218 may allow only a focused laser beam returning from a certain distance or certain distance range to pass through at each time point.

Photodetector 220 may be configured to detect the focused laser beam 217. In some embodiments, photodetector 220 may convert the laser beam into an electrical signal 219 (e.g., a current or a voltage signal). Electrical signal 219 may be an analog signal which is generated when photons are absorbed in a photodiode included in photodetector 220. In some embodiments, photodetector 220 may include a PIN detector, an avalanche photodiode (APD) detector, a single photon avalanche diode (SPAD) detector, a silicon photo multiplier (SiPM) detector, or the like. In some embodiments, photodetector 220 may include a plurality of photosensors or pixels arranged in a one-dimensional or two-dimensional array.

Readout circuit 222 may be configured to integrate, amplify, filter, and/or multiplex signal detected by photodetector 220 and transfer the integrated, amplified, filtered, and/or multiplexed signal 221 onto an output port (e.g., controller 206) for readout. In some embodiments, readout circuit 222 may act as an interface between photodetector 220 and a signal processing unit (e.g., controller 206). Depending on the configurations, readout circuit 222 may include one or more of a transimpedance amplifier (TIA), an analog-to-digital converter (ADC), a time-to-digital converter (TDC), or the like.

Controller 206 may be configured to control transmitter 202 and/or receiver 204 to perform detection/sensing operations. For instance, controller 206 may control laser emitter 208 to emit laser beams 207, or control tunable collimation lens 210 to tune beam divergence. In some embodiments, controller 206 may also implement data acquisition and analysis. For instance, controller 206 may collect digitalized signal information from readout circuit 222, determine the distance of object 214 from LiDAR system 102 according to the travel time of laser beams, and construct a high-definition map or 3-D buildings and city modeling surrounding LiDAR system 102 based on the distance information of object(s) 214. In some embodiments, controller 206 may be further coupled to tunable collimation lens 210 to control operation of the tunable collimation lens, as further described in detail below.

FIGS. 3A-3B each illustrate a side view of an exemplary tunable collimation lens with or without displacement respectively, according to embodiments of the disclosure. As illustrated in FIG. 3A, tunable collimation lens 210 may be a pair of Alvarez lenses including two identical lens elements 302a and 302b arranged in tandem along an optical axis 304. According to some embodiments, the two lens elements 302a and 302b may be not exactly identical, but rather show a certain degree of difference.

For each lens element 302a or 302b in tunable collimation lens 210, it may be a cylinder shape (or a block shape or other shapes) that includes a flat or planar surface on the side of the incoming optical signal (e.g., for lens element 302b in FIGS. 3A-3B) or outgoing optical signal (e.g., for lens element 302a in FIGS. 3A-3B). On the opposite side of the flat surface or planar surface, each lens element 302a or 302b may include a freeform surface with a curvature. The thickness (measured along the optical axis 304, which is z-direction as illustrated in FIGS. 3A-3B) between the planar surface and the curved freeform surface of each lens element may vary in the transverse plane (e.g., the x-y plane in FIGS. 3A-3B) and may be governed by certain equations. According to one example, the equations may be as follow:

$$t_1 = A(xy^2 + \tfrac{1}{3}x^3) + +Bx + C \qquad (1)$$

$$t_2 = -A(xy^2 + \tfrac{1}{3}x^3) - Bx + C \qquad (2)$$

where $t_1$ and $t_2$ are the thickness of the lens elements 302a and 302b, respectively, A, B, and C are constants, and x and y are transverse coordinates normal to z, as shown in FIGS. 3A-3B. When there is no displacement between the two lens elements 302a and 302b, the combined thickness t1+t2=2C, thereby simulating the shape of a parallel plate. Therefore, an incoming laser beam 207 passing through the Alvarez lens elements is unfocused, as shown by the outgoing laser beam 209a in the righthand part of FIG. 3A. However, when there is a displacement laterally in the x-direction (e.g., when lens element 302b moves to the left, or lens 302a moves to the right, or both, as shown in FIG. 3B), the combined thickness of the two Alvarez lenses may form a parabolic shape, thereby simulating a shape of a converging lens. At this point, the incoming beam 207 passing through the Alvarez lenses will be converged to a focused laser beam 209b, as illustrated in the righthand part of FIG. 3B.

In some embodiments, the focal length of the outgoing laser beam 209b may correspond to the degree of the displacement between the two lens elements 302a and 302b within tunable collimation lens 210. That is, when the two lens elements have a large displacement (i.e., a longer travel distance from its default location), the focused laser beam may have a small focal length. On the other hand, if the two lens elements have a small displacement (i.e., a shorter travel distance from its default location of one or both lens elements), the focused laser beam may have a large focal length. Accordingly, by varying the displacement length between the two lens elements, the convergence of the outgoing laser beam 209 may be dynamically controlled. This then allows the outgoing beam divergence to be also dynamically tuned correspondingly. For instance, by further collimating the laser beam 209 tuned by tunable collimation lens 210, the outgoing beams emitted to the scanner 212 then have different beam divergence amount. A larger displacement between the two lens elements 302a and 302b will lead to a smaller beam divergence of a laser beam emitted by the transmitter 202, while a smaller displacement between the two lens elements 302a and 302b will lead to a larger beam divergence of a laser beam emitted out of transmitter 202.

In some embodiments, when LiDAR system 102 detects or senses objects at a different distance, the spot size of a returning laser beam may be adjusted to have a different size, as described earlier. In general, the spot size of a returning laser beam is determined by the beam divergence of the laser beam emitted out of the collimation lens elements in transmitter 102. If the beam divergence of the emitted laser beam is small, the spot size of the corresponding returning laser is generally small. However, if the beam divergence of the emitted laser beam is large, the spot size of the corresponding returning laser is generally large. Since adjusting the displacement length of the Alvarez lenses can tune the beam divergence of the emitted laser beam, one way to tune the spot size of a returning laser beam is to adjust the displacement of the Alvarez lenses disclosed herein.

Figure 4:
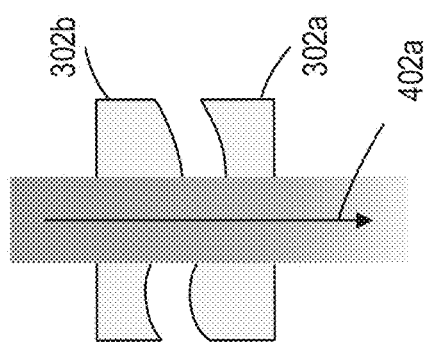
FIG. 4 illustrates an exemplary application scenario for tuning a returning beam spot size using an Alvarez lens set, according to embodiments of the disclosure.
Figure 4:
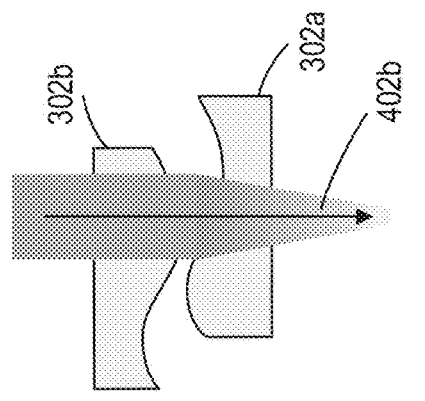
Figure 4:
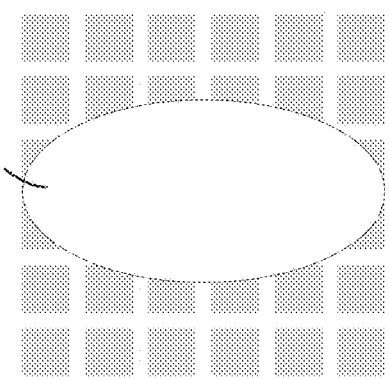
Figure 4:
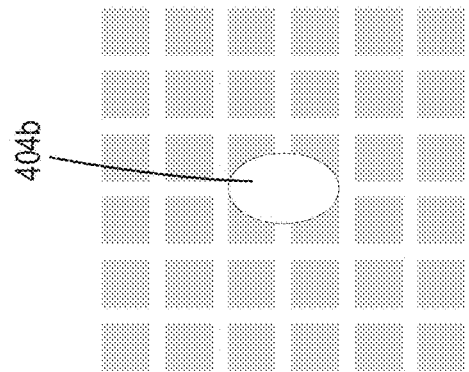

FIG. 4 illustrates an exemplary application scenario 400 for tuning a returning beam spot size using an Alvarez lens set, according to embodiments of the disclosure. Left part of the figure illustrates a situation when there is no displacement between the two lens elements 302a and 302b of the Alvarez lenses. Righthand part of the figure illustrates a situation when there is a displacement between the two lens elements 302a and 302b. As illustrated in the figure, by increasing the displacement of the Alvarez lenses, the spot size of a returning laser beam on the photodetector becomes smaller. In the illustrated embodiment, when there is no displacement, the spot size 404a of a returning laser beam 402a may fully or partially cover twenty pixels (e.g., a pixel can be a photodiode in the photodetector 220 consistent with this disclosure), as illustrated in the bottom-left part of FIG. 4. However, if there is a displacement between the Alvarez lenses, the spot size 404b of the returning laser beam 402b may just partially cover four pixels, as illustrated in the bottom-right part of FIG. 4.

In the above exemplary scenario, since the laser power of the emitted laser beam 402a or 402b may remain the same, by adjusting the Alvarez lens displacement and the corresponding spot size of the returning laser beam, the signal strength detected by each pixel in the photodetector 220 can be also adjusted accordingly. That may then allow a per-pixel signal-strength control when sensing of environment objects at a different distance. For instance, for objects at a far distance, it may be better to increase the displacement of the Alvarez lenses, so as to ensure the signal detected by each pixel of photodetector 220 to be strong enough to achieve a necessary signal-to-noise ratio for effective or high-resolution detection. On the other hand, if the objects are located at a short distance from a LiDAR system 102, it may be better to decrease the displacement of the Alvarez lenses, so that the signal detected by each pixel of photodetector 220 is not too strong to avoid saturation. In addition, by decreasing the displacement of the Alvarez lenses, it also increases the beam divergence and thus the coverage of each laser beam in scanning. Therefore, the steps required for scanning the objects at a closer distance may be decreased, thereby increasing the efficiency of the LiDAR system in optical signal sensing or detection. A better illustration of tunable Alvarez lenses for detecting objects at different distances is further provided below in FIG. 5.

Figure 5:
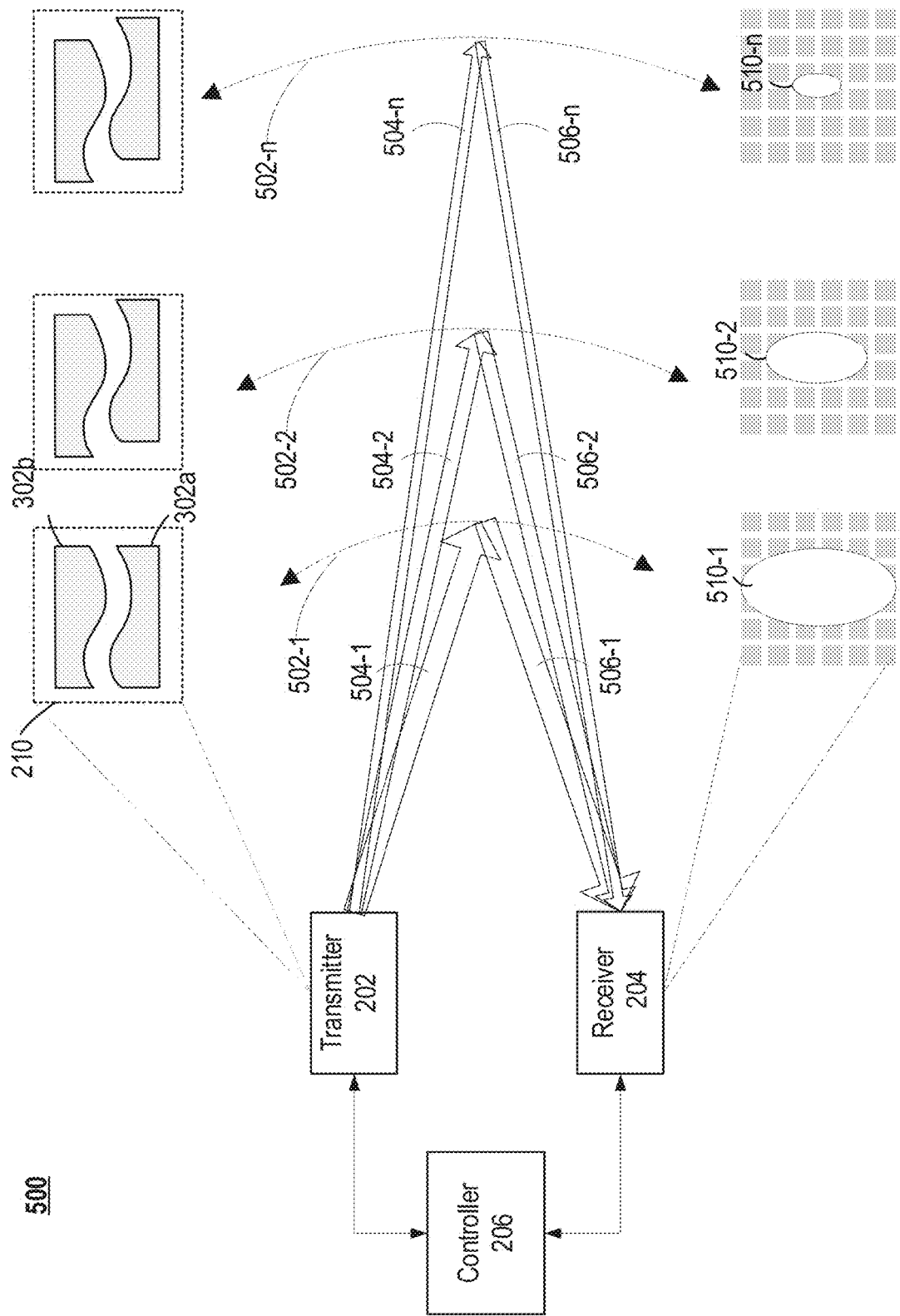
FIG. 5 illustrates an exemplary application scenario for tuning an Alvarez lens set for detecting objects at different distance, according to embodiments of the disclosure.

FIG. 5 illustrates an exemplary application scenario 500 for tuning Alvarez lenses for detecting objects at different distances, according to embodiments of the disclosure. As illustrated, when detecting an object at a close distance, for instance, at a distance indicated by the dotted curved arrow 502-1, the two lens elements 302a and 302b of the Alvarez lenses in transmitter 202 may remain at their default positions (i.e., the positions when there is no displacement between the two lens elements 302a and 302b). At this moment, the outgoing laser beam 504-1 may have a relatively large beam divergence, and the returning laser beam 506-1 may also have a relatively large spot size detected by photodetector 220, as indicated by an ellipse 510-1. Meanwhile, the signal picked up by each pixel in photodetector 220 may be not so strong. However, when detecting an object that is a little farther, e.g., at a distance as indicated by the dotted curved arrow 502-2, the two lens elements 302a and 302b may have a relatively small displacement, as indicated in the top-middle part in FIG. 5. At this moment, the outgoing laser beam 504-2 may have a smaller beam divergence than laser beam 504-1, and the returning laser beam 506-2 may also have a smaller spot size, as indicated by an ellipse 510-2. Meanwhile, the signal strength picked up by each pixel in photodetector 220 may become stronger than those picked up from ellipse 510-1. Similarly, when detecting objects that are even farther, the two lens elements may be further displaced, then the spot size of a detected laser beam may be even smaller, as indicated by an ellipse 510-$n$. Meanwhile, the signal picked up by each pixel in photodetector 220 may become even stronger. This may facilitate the detection of objects that are far from a LiDAR system 102.

From the above, it can be seen that by controlling the displacement between the two lens elements 302a and 302b, the detected signal for objects located at different distances can be dynamically adjusted and optimized, e.g., to a level determined to be proper for objects at the respective distances. This may help prevent objects too close or too far from being detected in error due to the signal detected by photodetector 220 being too strong or too weak. This then facilitates the application of a LiDAR system in situations with a frequent environment change.

For instance, when a vehicle loaded with LiDAR system 102 is traveling in an urban area where there is a lot of objects close to the vehicle (e.g., traffic, pedestrians, traffic control structures, etc.), it may be beneficial to control the displacement between the two lens elements 3021 and 302b to be minimal, so that the signals detected by photodetector 222 are not saturated. In addition, by controlling the displacement to be minimal, the beam size and the coverage of each scanning step can be larger, so as to save scanning time. On the other hand, if the vehicle travels to a rural area where there is not so much traffic and surrounding structures, it may be beneficial to focus on the objects that are at a larger distance. For instance, it may be beneficial to focus on the cars that are farther away from the vehicle, since the cars in the rural area may run faster, and thus it may require more time to prepare for unexpected movements of these cars. Accordingly, the displacement between the two lens elements 302a and 302b may be controlled to be larger, so that the objects (such as moving cars or moving wild animals) at farther distances can be accurately sensed or detected by the LiDAR system.

Under certain circumstances, if areas both closeby and far away need to be detected, the Alvarez lenses may be controlled to scan the close area with no or minimal Alvarez lens displacement, and slowly increase the Alvarez lens displacement at a certain rate to scan objects/areas at different distances. For one example, the whole scanning area may be divided into different sections with different ranges of distances, where each section may be scanned with one Alvarez lens displacement length. For instance, the scanning area in the application scenario illustrated in FIG. 5 may be divided into N sections, each section covering an area between the two dotted curved arrows (except the first section, which covers the area from the LiDAR system to the first dotted curved arrow 502-1). For instance, dotted curved lines 502-$n$ and 502-$n$-1 (not shown) define section N, dotted curved lines 502-$n$-1 and 502-$n$-2 (not shown) define section N-1, and so on. Each section of 1, 2, ..., N may be then detected under an Alvarez lens displacement length of $D_1$, $D_2$, ..., $D_n$, where $D_n > D_{n-1} > ... > D_2 > D_1$.

In some embodiments, to allow returning beams with proper spot sizes to be detected from each section while returning beams with unwanted spot sizes to be blocked, a LiDAR system 102 may optionally include an electric shutter 218 disposed right before photodetector 220. Electric shutter 218 may be configured to open at a certain time window for each section, so that returning laser beams from other sections will be blocked and will not be detected. That is, for each section, only returning laser beams with proper spot sizes can reach photodetector 220. By sequentially opening electric shutter 218 for each section, an optimized detection of the whole area may be then achieved. In some embodiments, when there is no electric shutter disposed before photodetector 220, different sections of the target scanning area can still be scanned under different Alvarez lens displacement lengths, to ensure each section to have returning laser beams with proper laser spot sizes. In this case, the detected signals can be post-processed to realize the function of the electric shutter (e.g., to prevent unwanted signals from interfering with the desired detection). For example, during signal processing (e.g., by controller 206), for each section (e.g., section N), only detected signals that correspond to a proper Alverez lens displacement length (e.g., $D_n$) are extracted for signal processing, but signals that correspond to other Alverez lens displacement lengths (e.g., from $D_1$ to $D_{n-1}$) are excluded from later processing. By processing the signal for each section this way, it can still be ensured that only signals with proper beam spot sizes be processed for each section, and thus the detection of the whole target scanning area is still optimized.

FIGS. 3A-5 illustrate the controlling of Alverez lens displacement in controlling the beam spot sizes of returning laser beams in optical signal detection of LiDAR system 102. To achieve such controlling of the Alvarez lens displacement, different mechanisms may be applied to control the lateral movement (i.e., x-direction in FIG. 3A, which is also a direction perpendicular to the optical axis) of the Alvarez lenses. According to one embodiment, the displacement of the Alvarez lenses may be controlled by MEMS electrostatic comb drive actuators, as further described in detail below in FIGS. 6A-6B.

FIG. 6A illustrates a top view of an exemplary Alvarez lens integrated into a platform including MEMS electrostatic comb drive actuators, according to embodiments of the disclosure. As illustrated, an Alvarez lens 302 (e.g., 302a or 302b in FIGS. 3A-5) may be integrated into a support platform comprising two comb drives 602a and 602b indicated by the respective dotted boxes. The two comb drives may be disposed on two sides of Alvarez lens 302. Each comb drive 602a or 602b may include a stationary comb and a movable comb. A stationary comb may include a stationary anchor 606a or 606b and a set of stationary teeth 608a or 608b fixed to the corresponding stationary anchor. A stationary comb may be located on a side farther away from Alvarez lens 302 when compared to a movable comb. A movable comb may include a movable anchor 610a or 610b, and a set of movable teeth 612a or 612b fixed to the corresponding movable anchor. In the middle section of a movable anchor, an elongated arm 614a or 614b may extend from a side surface of movable anchor 610a or 610b away from movable teeth 612a or 612b. Two elongated arms 614a and 614b together may hold Alvarez lens 302 from two opposite sides. As illustrated, if Alvarez lens 302 is a cylinder shape, a holding structure 630 may hold Alvarez lens inside the holding structure, and two elongated arms 614a and 614b together may be fixed to holding structure 630 instead. In some embodiments, when a force is applied to comb drive 602a and/or 602b, movable comb(s) may be driven to move, which further causes elongated arms 614a and/or 614b to move, thereby driving Alvarez lens 302 to move laterally.

Consistent with some embodiments, each tooth in a stationary teeth 608a or 608b or movable teeth 612a or 612b may have a predefined width or a width range. Further, stationary teeth 608a/608b and movable teeth 612a/612b may be also tightly spaced and interleaved with each other when a movable comb moves close to the corresponding stationary comb. Accordingly, adjacent comb teeth may be spaced in a way to form a gap that ensures no contact between the teeth during the movement of a movable comb. In some embodiments, the smoothness of the teeth may also be controlled, to allow for tightly-packed formation of the interleaved combs. This may ensure the overall size of each comb drive to be scaled down to some extent, which is beneficial for a compact design of receiver 204 of LiDAR system 102.

In some embodiments, the length of each tooth, the overlap between the stationary teeth and the movable teeth in the absence of force, and the number of teeth on each stationary comb or movable comb may be selected in consideration of the target force developed between the stationary combs and the movable combs, as well as the maximum displacement length of Alvarez lens 302. According to one embodiment, the length of each tooth in the set of stationary teeth 608a/608b or movable teeth 612a/612b may be at least longer than the maximum displacement of Alvarez lens 302 when tuning the beam divergence in a sensing process.

In some embodiments, between a movable anchor 610a/610b and Alvarez lens 302, a couple of folded flexure suspension structures 616a or 616b may be further disposed symmetrically on two sides of elongated arm 614a or 614b. The folded flexure suspension structures 616a and 616b may allow Alvarez lens 302 and the movable combs to move along one direction (e.g., a direction perpendicular to the optical axis of transmitter 202), while restraining any other degree-of-freedom (e.g., restricting movements in other directions). Therefore, Alvarez lens displacement can be properly controlled through comb drive actuators. As illustrated in FIG. 6A, each folded flexure suspension structure 616a or 616b may further include a suspension anchor 618a or 618b and a couple of column beams 620a or 620b. Suspension anchor 618a or 618b may be fixed and non-movable. Meanwhile, column beam 620a or 620b may itself include a spring structure that deflects to accommodate the movements of elongated arm 614a/614b and the corresponding movable comb moving towards the respective stationary comb. The spring structure may act as a spring to restore a moved comb and Alvarez lens 302 to their default positions (e.g., positions when there is no displacement for Alvarez lens 302) in the absence of an applied force that controls the movement of Alvarez lens 302. It is to be noted that the above configuration of folded flexure suspension structures 616a or 616b is merely one example configuration, and the disclosure contemplates other forms of folded flexure suspension structures or even other forms of controlling mechanisms for controlling the lateral movement of Alvarez lens 302 while restricting other degree-of-freedom.

FIG. 6A merely illustrates integration of one Alvarez lens into MEMS electrostatic comb drive actuators. However, for the pair of Alvarez lenses to work properly, both Alverez lens elements 302a and 302b may be controlled to move, according to some embodiments. Therefore, each of Alvarez lens elements 302a and 302b may be integrated into a platform as shown in FIG. 6A. For instance, each of Alvarez lens elements 302a and Alvarez lens element 302b may be integrated into such a platform, as illustrated in FIG. 6B. In this way, both Alvarez lens elements 302a and 302b may move independently. For instance, Alvarez lens element 302b may move to the left, while Alvarez lens element 302a may move to the right. In some embodiments, to achieve a target Alvarez lens displacement, both Alvarez lenses may move simultaneously. This then saves time to move the Alvarez lenses to a target displacement when compared to just moving one Alvarez lens. In addition, by moving the two Alvarez lenses simultaneously, the maximum travel distance of each Alvarez lens may be decreased to half of the maximum displacement length if just one Alvarez lens is moved, which then saves space required for packaging the whole transmitter for LiDAR system 102. In addition, if just moving one Alvarez lens, spring structure in a column beam 620a or 620b may need to endure a larger deflection, which necessarily shortens the life of these column beams. Accordingly, by configuring the two Alvarez lenses to move simultaneously as shown in FIG. 6B, a better lifetime, a more compact design, and a higher efficiency may be achieved. However, in some implementations, a target tuning of beam spot size can also be achieved by moving just one Alvarez lens while keeping the other Alvarez lens static. Specific details regarding how to control the displacement of an Alvarez lens from a default non-displaced position to a displaced position by MEMS electrostatic comb drive actuators will be provided hereinafter with reference to FIGS. 7A-7B.

Figure 7A:
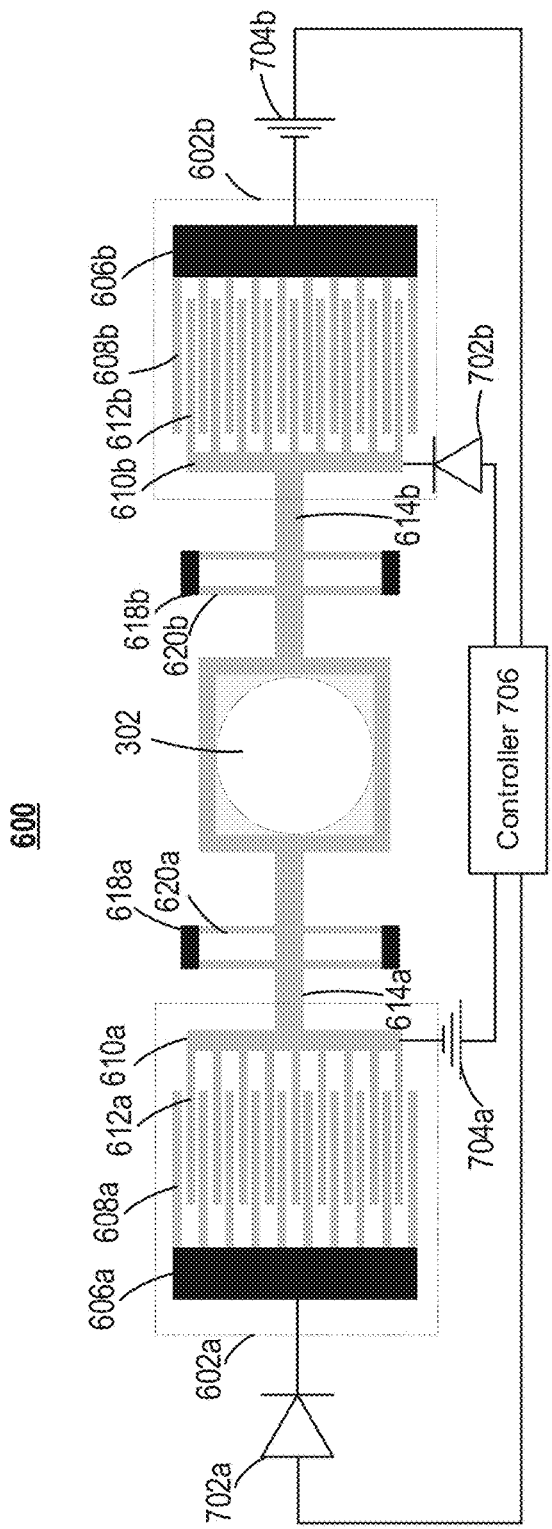
FIG. 7A illustrates a schematic diagram of an exemplary control system for controlling displacement of an Alvarez lens, according to embodiments of the disclosure.
Figure 7B:
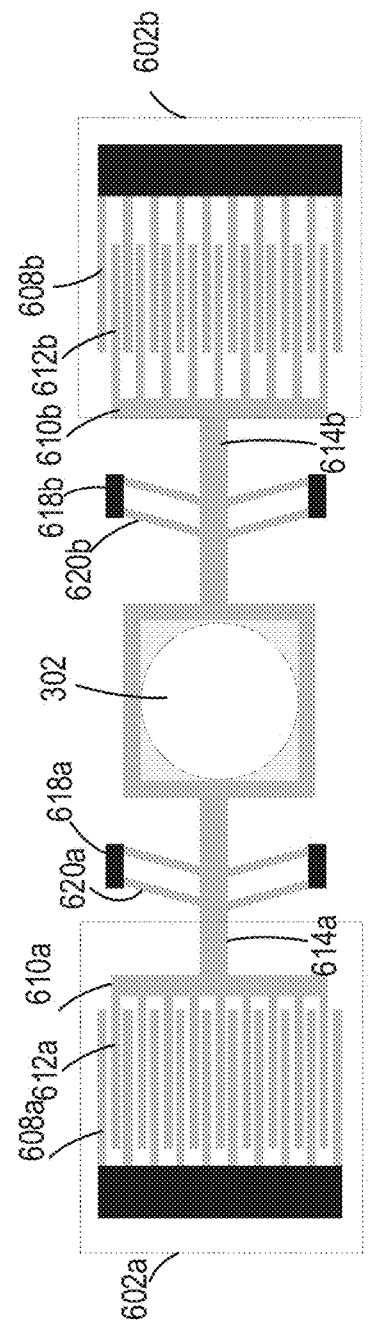
FIG. 7B illustrates a top view of an exemplary Alvarez lens displacement, according to embodiments of the disclosure.

FIG. 7A illustrates a schematic diagram of an exemplary control system for controlling displacement of an Alvarez lens. As illustrated, each comb drive 602a or 602b of the Alvarez lens supporting platform may be coupled to an anode and a cathode. According to one example, left stationary anchor 606a may be electrically connected to anode 702a, while left movable anchor 610a may be electrically connected to cathode 704a. The coupled anode 702a/cathode 704a may apply a voltage differential between the left stationary comb and left movable comb, thus creating a force that attracts the left movable comb to move to the left stationary comb, as shown in FIG. 7B. Such movement may drag Alverez lens 302 to move laterally to the left, along with the elongated arms, as also shown in FIG. 7B.

As also shown in FIG. 7B, when the Alvarez lens 302 moves to the left, the movable comb on the right side of the Alvarez lens also moves left, which means that the corresponding right movable comb actually moves away from the right stationary comb. That is, when an attraction force is applied to left com drive 602*a* to drag the left movable comb to move closer to the left stationary comb, an expelling force (or no force) may be necessarily applied to repel the right movable comb to move away from the right stationary comb. To achieve this, the anode/cathode connection for the right comb drive 602*b* may be contrary to the configuration of the left comb drive 602*a*. That is, the right movable anchor 610*b* may be connected to anode 702*b* while the right stationary comb 606*b* may be connected to cathode 704*b*. In this way, when the same voltage differential is applied to the left comb drive 602*a* and the right comb drive 602*b*, the applied attraction force/repelling force will cooperatively move Alvarez lens 302 to a same direction (e.g., to the left as shown in FIG. 7B). In some embodiments, the movable anchor and stationary anchor on the right side of Alvarez lens 302 may connect to the anode/cathode in a same way as the movable anchor and stationary anchor on the left side of Alvarez lens 302. To make sure that the attraction/repelling force is applied cooperatively, an opposite voltage differential may be applied to the left comb drive 602*a* and the right comb drive 602*b* simultaneously.

In some embodiments, a controller 706 may control the voltage differential applied to each comb drive 602*a* or 602*b*. For instance, controller 706 may be configured to control what type and/or what level of a voltage differential should be applied to comb drive 602*a* or 602*b*, and/or at what time a voltage differential should be applied, all of which may collectively allow a precise controlling of the movement and displacement of Alvarez lens 302. In some embodiments, controller 706 for the comb drives 602*a* and 602*b* may be the same as controller 206 for LiDAR system 102, as illustrated in FIG. 2. In some embodiments, controller 706 may be separate and independent of controller 206, and implemented as a specialized controller specifically configured for the left and right comb drives 602*a* and 602*b*. In some embodiments, each Alverez lens may have a corresponding controller 706. In some embodiments, a same controller 706 may control the displacement of both Alverez lenses in the Alvarez lens set, including controlling the simultaneous movements of the two Alvarez lenses in opposite directions.

In some embodiments, controller 706 may dynamically control the displacement of Alvarez lens according to the environment information surrounding a LiDAR system 102. For instance, if the environment information indicates that there are a large number of objects close (e.g., 5 m, 10 m, 15 m, etc.) to the LiDAR system, controller 706 may control the displacement of the Alvarez lenses to be smaller or even no displacement. Controller 706 may thus control the voltage differential applied to the comb drives to be lower or even no voltage differential is applied, so that the Alvarez lenses move a little or do not move at all. In this way, the returning beam spot sizes from these close objects will not be too small and thus the detected signal on each pixel will not saturate. On the other hand, if the environment information indicates that there are not many objects close to the LiDAR system, but rather more objects can be found at a farther distance (e.g., 30 m, 50 m, 100 m, etc.), controller 706 may then control the displacement of the Alvarez lenses to be enhanced, so that the returning beam spot sizes to be decreased and the signal detected by each pixel to become stronger. This then allows objects at a far distance to be detected with a sufficient resolution or with sufficient sensitivity. That is, controller 706 may dynamically control the voltage differential applied to the comb drives that drive the movements of Alvarez lenses, so as to tune the returning beam spot size in signal detection and object sensing.

Controller 706 may collect environment information through a large variety of channels. In some embodiments, controller 706 may collect environment information by wired or wireless communication with other components in a vehicle 100. For instance, controller 706 may communicate with a GPS receiver to receive location information and/or traffic information surrounding vehicle 100. Based on the location information, controller 706 may determine whether there are static objects surrounding the vehicle (e.g., traffic controlling structures and city building and facilities, etc.) using certain map applications. Based on the traffic information, controller 706 may determine whether there are many cars moving around or not. In some embodiments, controller 706 may communicate with imaging system(s) or other sensors that may be actively collecting environment information. In some embodiments, controller 706 may collect environment information based on the information collected by a LiDAR system itself. For instance, signal processed by controller 206 may also provide instant environment information, such as the number of surrounding objects and the distance of each object. This environment information analyzed by controller 206 may be instantly communicated to controller 706, if controller 706 is an independent control system that is separated from controller 206. In some embodiments, controller 760 may also receive instant environment information from other resources, such as a remote server, a traffic control system built along the traffic roads/streets, a neighbor vehicle, etc. Once the live environment information is received, controller 706 may determine what displacement length of an Alvarez lens should be applied in object sensing, and thus apply the corresponding voltage differentials to the comb drives for instant adjustment of outgoing beam divergence and the returning beam spot size, as previously described. In this way, the environment object sensing can be dynamically adjusted on-the-fly to detect objects with different distances.

Figure 8:
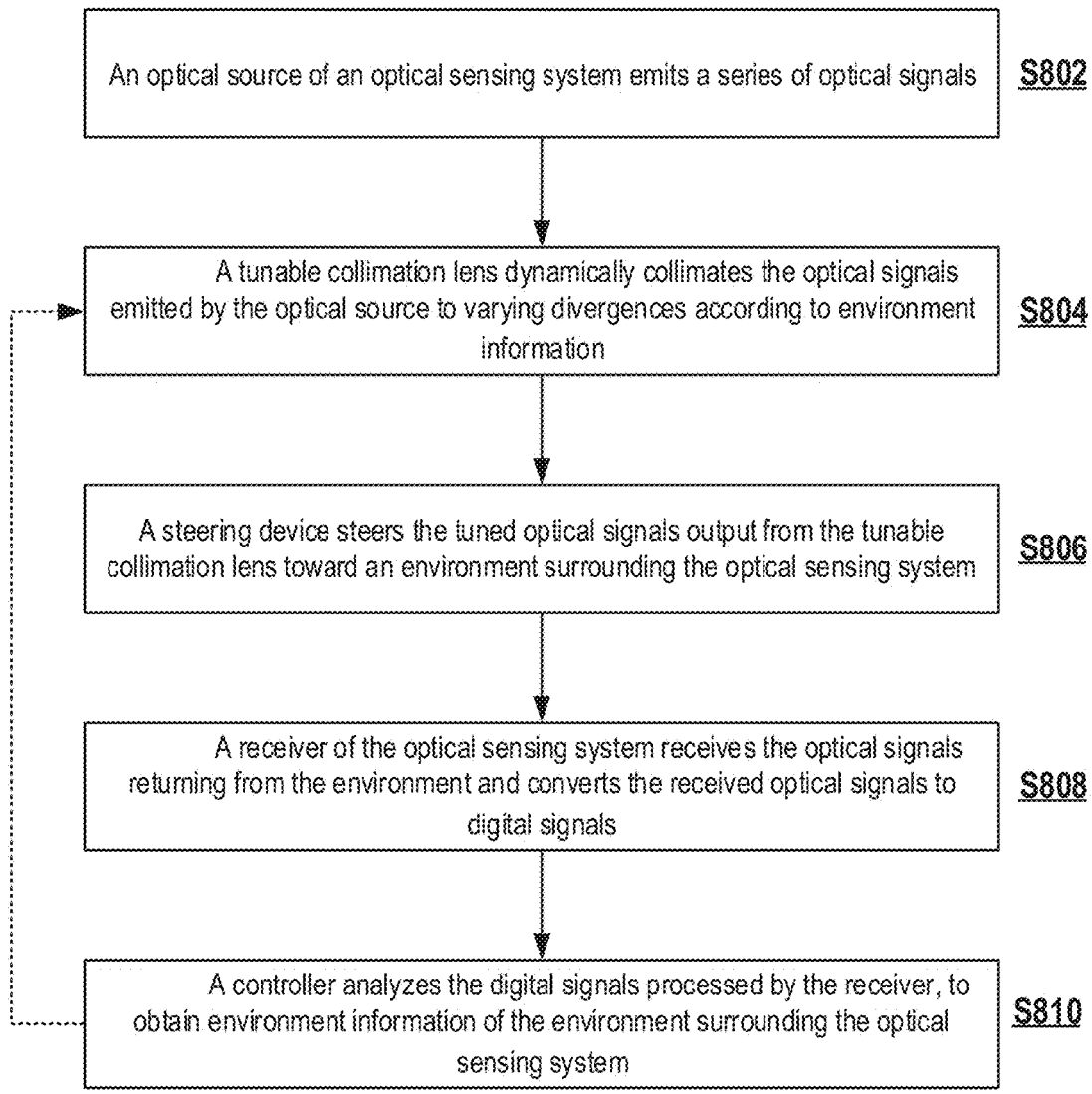
FIG. 8 is a flow chart of an exemplary optical sensing method of a LiDAR system containing a tunable collimation lens, according to embodiments of the disclosure.

FIG. 8 is a flow chart of an exemplary optical sensing method 800 performed by a LiDAR system containing a tunable collimation lens, according to embodiments of the disclosure. In some embodiments, method 800 may be performed by various components of LiDAR system 102, e.g., transmitter 202 containing tunable collimation lens 210, receiver 204, and/or controller 206. In some embodiments, method 800 may include steps S802-S810. It is to be appreciated that some of the steps may be optional. Further, some of the steps may be performed simultaneously, or in a different order than that shown in FIG. 8.

In step S802, an optical source (e.g., laser emitter 208) inside a transmitter of an optical sensing system (e.g., transmitter 202 of LiDAR system 102) may emit a series of optical signals. Here, the series of optical signals may be emitted by the optical source at a predefined time interval apart. In addition, the series of signals may have a same wavelength and have a same power during a certain period when the optical sensing system is sensing an environment surrounding the system. The series of optical signals may have a same beam divergence when emitted by the optical source.

In step S804, a tunable collimation lens (e.g., tunable collimation lens 210 of LiDAR system 102) may dynamically collimate the series of optical signals emitted by the light source to varying beam divergences according to environment information. For instance, the tunable collimation lens may collimate a first number of beams to beams having a first beam divergence, and collimate a second number of beams to beams having a second beam divergence according to the environment information. The second beam divergence may be the same or different from the first beam divergence, depending on the environment information. In some embodiments, the tunable collimation lens may dynamically adjust the beam divergences on-the-fly. That is, the tunable collimation lens may dynamically collimate some optical signals to a different divergence based on live information of the changing environment surrounding the optical sensing system. If the environment information indicates that an object(s) in the environment is far from the optical sensing system, the tunable collimation lens may dynamically collimate the received optical signals to beams at a small divergence. On the other hand, if the environment information indicates that the object(s) in the environment is close to the optical sensing system, the tunable collimation lens may dynamically collimate the received optical signals to beams at a large beam divergence.

In step S806, a steering device (e.g., scanner 212 in transmitter 202 of LiDAR system 102) may steer the tuned optical signals output from the tunable collimation lens toward the environment surrounding the optical sensing system. The steering device may steer the tuned optical signals according to a predefined pattern, so that different parts of the environment may be scanned over a short period of time. For instance, some parts of the environment may include certain objects located at a certain distance from the optical sensing system. When the series of optical signals are steered towards these objects, these objects may reflect at least portions of the optical signals back to the optical sensing system. The returning optical signals may have a certain beam spot size when detected by a photodetector (e.g., photodetector 220 of LiDAR system 102) of the optical sensing system. If the beam divergence is tuned as previously described, the returning beam spot size may be adjusted for better detecting these objects at that distance.

In step S808, the receiver (e.g., receiver 204) of the optical sensing system may receive the returning series of optical signals. The receiver may include a photodetector with multiple pixels. The retuning series of optical signals may be detected by one or more pixels inside the photodetector. Due to the optimized beam spot size, the picked-up signal by each pixel may have a proper signal intensity, for instance, not too strong so that the detected signal is saturated, or not weak to be detected with a high enough resolution. In some embodiments, these received optical signals may be converted to electrical signals and further to digital signals, which are then forwarded to a signal processing system or data analysis system of the optical sensing system (e.g., controller 206 of LiDAR system 102).

In step S810, the signal processing system or data analysis system of the optical sensing system may further process the digital signals received from the receiver. The signal processing may include constructing a high-definition map or 3-D buildings and city modeling based on the received digital signals. In some embodiments, the signal processing may also include identifying the objects in the environment surrounding the system, and/or the corresponding distance information of these objects. The distance information of these objects may be then provided to a controller (e.g., controller 706) of the tunable collimation lens, to dynamically tune the next series of optical signals received from the optical source of the optical sensing system. In this way, the beam divergences of the outgoing optical signals and receiving beam spot sizes may be continuously monitored and dynamically tuned to optimum levels, to allow objects with a different distance in the environment to be detected with high accuracy and consistency.

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. An optical sensing method for an optical sensing system, the method comprising:
   determining environment information of an environment surrounding the optical sensing system, wherein the environment information indicates a current detection distance of the optical sensing system;
   determining a divergence amount for outgoing optical signals emitted by an optical source of the optical sensing system, based on the current detection distance, wherein the divergence amount is a target divergence amount determined to be smaller at a larger current detection distance to reduce a beam spot size of returning optical signals;
   dynamically adjusting the outgoing optical signals to the target divergence amount; and
   emitting the outgoing optical signals to the environment.

2. The optical sensing method of claim 1, wherein the environment information is determined according to information collected from one or more sensors associated with the optical sensing system.

3. The optical sensing method of claim 1, wherein the environment information is determined according to information analyzed by the optical sensing system based on a previous optical signal emitted to the environment and received by the optical sensing system after returning from the environment.

4. The optical sensing system of claim 1, wherein the current detection distance is indicated by distance information of an object.

5. The optical sensing method of claim 4, wherein determining the divergence amount for the optical signals based on the environment information comprises:
 determining the divergence amount for the optical signals based on the distance information for the object in the environment.

6. The optical sensing method of claim 5, wherein the divergence amount inversely corresponds to a distance of the object from the optical sensing system.

7. The optical sensing method of claim 5, wherein the divergence amount is determined to be a first divergence when there is a first object in the environment at a first distance away from the optical sensing system or a second divergence amount when there is a second object in the environment at a second distance away from the optical sensing system, wherein the second distance is longer than the first distance and the second divergence amount is smaller than the first divergence amount.

8. The optical sensing method of claim 1, wherein the environment is divided into a plurality of sections, each section covering a range of distances from the optical sensing system, and determining the environment information comprises determining an object in the environment and the section in which the object is located in the environment.

9. The optical sensing method of claim 8, determining the divergence amount for the optical signals based on the environment information comprises:
 determining the divergence amount for the optical signals based on the section of the environment in which the object is located.

10. The optical sensing method of claim 9, wherein the divergence amount inversely corresponds to an overall distance of the section from the optical sensing system.

11. The optical sensing method of claim 1, wherein dynamically adjusting the outgoing optical signals to the determined divergence amount further comprises:
 collimating the optical signals to the determined divergence amount by dynamically tuning a tunable collimation lens.

12. The optical sensing method of claim 11, wherein the tunable collimation lens comprises a pair of Alvarez lenses arranged in tandem.

13. The optical sensing method of claim 12, wherein at least one of the pair of Alvarez lenses is movable along a direction perpendicular to a direction of the optical signals.

14. The optical sensing method of claim 13, wherein dynamically tuning the tunable collimation lens comprises:
 dynamically moving the at least one of the pair of Alvarez lenses to adjust divergence of the optical signals collimated by the tunable collimation lens to the determined divergence amount.

15. The optical sensing method of claim 13, wherein a movement of the at least one movable Alvarez lens is controlled by a pair of comb drive actuators.

16. A transmitter of an optical sensing system, comprising: an optical source, configured to emit optical signals;
 a controller, configured to determine environment information of an environment surrounding the optical sensing system, wherein the environment information indicates a current detection distance of the optical sensing system; the controller further configured to determine a divergence amount for the optical signals based on the current detection distance, wherein the divergence amount is a target divergence amount determined to be smaller at a larger current detection distance to reduce a beam spot size of returning optical signals; and
 a divergence adjustment device, coupled to the controller and configured to dynamically adjust the optical signals to the determined target divergence amount for emitting to the environment.

17. The transmitter of claim 16, wherein the environment information is determined according to information collected from one or more sensors associated with the optical sensing system.

18. The transmitter of claim 16, wherein the environment information is determined according to information analyzed by the optical sensing system based on a previous optical signal emitted to the environment and received by the optical sensing system after returning from the environment.

19. The transmitter of claim 16, wherein the current detection distance is indicated by distance information of an object.

20. The transmitter of claim 19, wherein determining the divergence amount for the optical signals based on the environment information comprises:
 determining the divergence amount for the optical signals based on the distance information for the object in the environment.

* * * * *